July 12, 1960

F. UNGERER 2,944,585

METHOD OF MANUFACTURING CURVED STRUCTURAL MEMBERS FROM SHEET METAL

Filed Feb. 14, 1956

INVENTOR
FRITZ UNGERER
BY

July 12, 1960  F. UNGERER  2,944,585
METHOD OF MANUFACTURING CURVED STRUCTURAL
MEMBERS FROM SHEET METAL
Filed Feb. 14, 1956  3 Sheets-Sheet 2
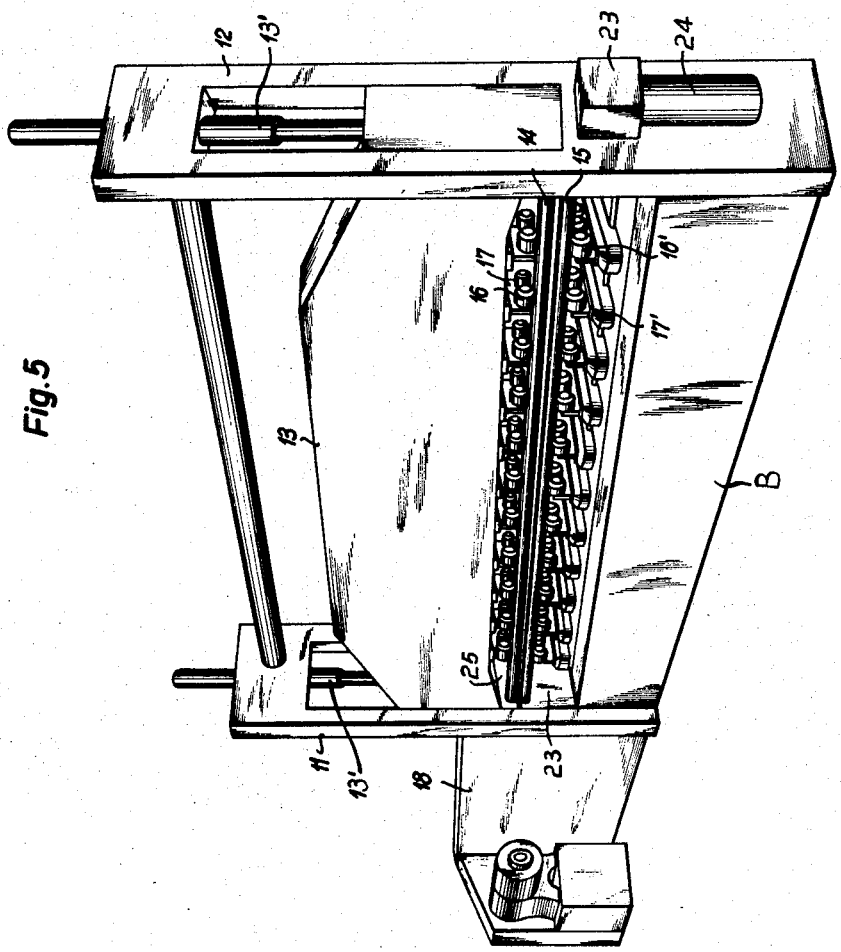
INVENTOR
FRITZ UNGERER July 12, 1960 F. UNGERER 2,944,585
METHOD OF MANUFACTURING CURVED STRUCTURAL
MEMBERS FROM SHEET METAL
Filed Feb. 14, 1956 3 Sheets-Sheet 3
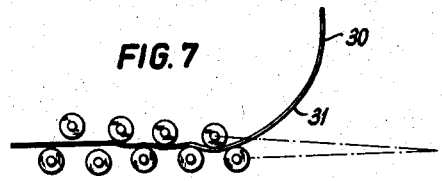
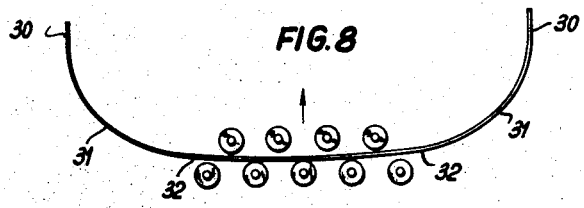
INVENTOR
FRITZ UNGERER

United States Patent Office 2,944,585
Patented July 12, 1960

2,944,585

METHOD OF MANUFACTURING CURVED STRUCTURAL MEMBERS FROM SHEET METAL

Fritz Ungerer, Arlinger Strasse 6,
Pforzheim-Brotzingen, Germany

Filed Feb. 14, 1956, Ser. No. 565,477

2 Claims. (Cl. 153—107)

This invention relates to a method of and a machine for manufacturing sheet metal structural members or parts of predetermined, varying curvature along at least one dimension of said members.

It is an important object of the present invention to provide means facilitating highly efficient and economical manufacture of relatively large and heavy curved structural parts from sheet metal and like materials in such a manner that a single machine may be employed for forming both straight or plane and curved portions of said parts.

It is another object of the present invention to provide means ensuring greatly simplified and time-saving high-speed operational techniques adapted for the production of accurately shaped, partly curved construction elements or members of considerable size for use as roofs or roof sections of railroad cars, trailers, certain types of buildings or parts thereof and like structures.

Another object of the present invention is to provide means affording a thoroughly efficacious machine for use in connection with the production of curved structural elements or members from substantially plane sheets of metal and like materials, said machine being constructed with adjustable working parts to enable spaced portions or sections of said sheets to be bent in opposite directions relative to a predetermined reference line merely through reversal of the direction of passage of said sheets through said machine from a first direction to a second direction in conjunction with a corresponding adjustment of said working parts.

Still another object of the present invention is to provide means contributing to novel and greatly improved machines for treating metal sheets, which machines are arranged for bending or curving plane sheets, for straightening more or less curved sheets and for curving and straightening different sections of one and the same sheet in one substantially continuous operation.

More particularly, the method according to the present invention is characterized by the use of a machine having lower and upper groups of straightening rollers, each group forming a roller bank, supported at a plurality of points and arranged to effect bending and rounding or curving of said metal sheets immediately after straightening thereof.

The machine, accordingly, includes two groups or banks of working rollers which may be adjusted with respect to each other, preferably through inclination of one of said groups as a unit relative to the other, in such a manner that those rollers positioned adjacent the discharge or delivery location of the metal sheet under treatment function as bending rollers, the working depth, i.e., the spacing between said bending rollers, being adjusted during the passage of the metal sheet through the machine, in accordance with the desired curvature to be imparted to said sheet.

Preferably, a straightening machine having a plurality of groups or banks of straightening rollers may be employed, with at least one roller of one group or bank of rollers being inclinable in the longitudinal direction of the rollers, so that the ends of said one roller, the position of which is changed during passage of the metal sheet, may be moved to different extents and/or in different directions to thereby enable a structural sheet metal part to be formed with a curvature varying transversely to the direction of motion of the sheet.

According to a modification of the method of the invention, preferably for manufacture of symmetrical structural elements or parts by means of a machine designed for reversal of the direction of the material through the machine from a first direction to a second direction during the working operation, a flat section is first formed on the metal sheet adjacent one edge or end thereof and thereafter curved sections extending approximately up to the center or intermediate portion of the sheet. Subsequently, upon reversal of the working direction from the first direction to the second direction, the other half of the sheet is similarly worked to complete the shaping of said structural part.

The present invention constitutes a solution to the problem of manufacturing large curved sheet metal parts, such as railroad car roofs or large car roof sections, measuring several feet or yards in length, rapidly and inexpensively instead of manufacturing them by welding relatively small sheets together as was heretofore the vogue. Prior to the present invention, it was customary to form a railroad car roof section about thirteen feet (four meters) long by welding eight appropriately dimensioned metal sheets together.

It was proposed to solve this problem by means of a special machine, for example, a sufficiently large drawing press, to be used in addition to the straightening machine employed in working the metal sheets. Alternatively, it was suggested to employ a cold rolling mill to function as a sheet bending machine, the working rollers of the mill being vaulted transversely to the direction of passage of the sheets.

In each of these proposed solutions, therefore, a special or auxiliary machine is required apart from the straightening machine. However, through the use of a straightening machine in accordance with the teachings of the present invention, such auxiliary or special machines may now be dispensed with.

By way of definition, the term "straightening machine" is here used to designate a machine in which the working rollers perform their straightening function not by virtue of their inherent rigidity resulting from a large diameter but in which, for the purpose of carrying out this function, they are supported by means of preferably adjustable supporting rollers spaced longitudinally of the working rollers. The straightening or working rollers can then be given small diameters, facilitating assembly thereof in groups or banks, and made as long as desired, for example, more than four meters long which is necessary for the construction of railroad car roofs or like structural parts.

When such a machine is employed for producing curved or rounded structural parts rather than for straightening purposes, an additional advantage results in that the machine is nevertheless still employable for such straightening purposes or for prestressing metal sheets prior to performance of welding operations thereon. In accordance with the invention, the machine may, of course, be additionally employed for curving or rounding out these or other sheets.

Inasmuch as machines contemplated for use in practicing this invention employ adjustable supporting rollers for the sheet contacting or working rollers, each of said working rollers having a relatively small diameter with respect to its length, the sheet-bending operation may be locally controlled or regulated over the entire length of said working rollers. This was not possible in the case of heretofore known working rollers of relatively large diameter generally used for rounding or bending of relatively narrow metal sheets.

Furthermore, the use, in accordance with the teachings of the present invention, of such straightening machine having groups of long thin rollers, makes it possible to take the thickness, hardness and other physical characteristics of the metal more precisely into account.

The class of structural members which are variably curved in one direction includes, for example, besides railroad car roofs or roof sections, side walls of such cars which are drawn in at their lower edges. It is also possible, by the method of the present invention, to construct parts curved transversely to the direction of passage of the sheet through the machine.

In such a case, if relatively small transverse curvatures are desired, the supporting rollers for the long, thin sheet contacting or working rollers may be correspondingly adjusted. If larger curvatures are desired, the machine must be modified accordingly through the use of working rollers, the profiles of which vary longitudinally thereof or which consist of longitudinally inclinable rollers or groups of rollers positioned adjacent one another.

By way of example, a railroad car roof may be constructed in accordance with the invention as follows:

The unshaped metal sheet having a first end portion, an intermediate portion and a second end portion is guided through the straightening machine in a first direction until a uniformly wide border section of the sheet is located at the delivery side of the machine and protrudes exteriorly of the latter. At this time, one of the groups of working rollers is tilted relative to the other group to form an acute angle therebetween, in such a manner that the apex of the angle is located on said delivery side of the machine.

The arrangement should be such that at least one of the tilted group of rollers, namely the one closest to the apex of said angle, extends into the space between two adjacent rollers of the other group or bank. In this manner, upon further passage of the sheet through the machine, that section of the sheet immediately adjacent the aforementioned border section is bent near one end and has imparted thereto the greatest curvature with the smallest radius of curvature.

Thereafter, the inclination of said one group of rollers is gradually or progressively decreased so that directly after the section of great or sharp curvature are formed sections of lesser curvature with relatively larger radius or radii of curvature. The tilted group of rollers is then approximately parallelized with the second group and the sheet further passed through the machine until at the insertion side of the machine there remains a uniformly wide border section protruding exteriorly of the machine. Continued movement of the sheet between the substantially parallel working rollers will cause a straightening of the left-hand portion.

The machine is stopped only when the last or left-hand section of the sheet is located still in flat condition between the rollers, the tiltable group of rollers is then inclined in the opposite direction, the machine reversed so that the sheet moves in the second direction and the previously described working operations carried out on the second half of the sheet with the latter moving in a direction opposite to its initial direction of movement.

It is to be noted, that if the aforementioned first end and second end of the sheet are to be rounded or curved, the overall length of said sheet must be at least greater in length between its ends than the stroke or travel of the sheet between the roller groups; thereby preventing the restraightening of the one curved end upon the subsequent reversal of the direction of travel of the workpiece.

It is already known, in connection with such straightening machines designed to be used in accordance with the present invention, to mount one of the groups of working rollers for tilting movement about an axis located in the plane of the straightening roller axes. It is further known to tilt such a group of rollers about and to either side of a centrally located axis.

The inclinability of these rollers has, however, been used heretofore only in straightening operations. To this end, the group of rollers was inclined in a direction opposite to the direction of passage of the sheet through the machine, whereby the apex of the angle of inclination was located at the feed or insertion side of the machine. The purpose of this arrangement was to ensure discharge of the initial portion of the sheet from the machine in a plane or flat and unrounded condition.

The inclinability of the rollers in opposite directions, i.e., about a central axis, was applied in a similar manner where reversal of the direction of passage of the sheet was involved. In accordance with the present invention, however, the inclinability of these rollers is made use of in a different manner and for a different purpose. Specifically, said one group is so inclined that the apex of the tilting or inclination angle is located at the discharge or delivery side of the machine, whereby when the inclination is sufficiently great the front rollers of the two groups of rollers serve to bend or round the sheet passing therebetween.

In accordance with a further modification of the invention, the finally shaped, trough-like structural member is released through upward retraction of the upper group of rollers, whereby it may be advanced and conveyed out of the machine over the lower rollers. The spacing between the upper and lower banks of rollers being of such magnitude so as to free the sheet from contact with the upper roller bank, thereby facilitating access to said trough-like structural member rapidly and easily. In this manner, even large workpieces can be easily and rapidly removed from the machine without possibility of accident and without necessitating the use of special conveying and lifting means.

In straightening machines of the above-mentioned type, it is furthermore already known to arrange the upper group of rollers for vertical adjustment or displacement. Such displacements have always been small and limited to the extent necessary because of the different thicknesses of sheets worked upon by the machines. In the new machine, in contradistinction to this, the upper group of rollers is displaceable to a much greater extent corresponding to the greatest degree of curvature of the largest trough-like workpiece to be manufactured on the machine.

If the adjustment of the rollers is not effected automatically in dependence on movement of the metal sheet, then it is preferable to provide indicia on the sheet which can be viewed during traverse of the sheet through the machine by means of a sighting arrangement. The rollers may then be adjusted by the operator during said traverse in accordance with the arrangement or other characteristics of said indicia. In lieu of a sighting device, an additional index mark may be positioned directly on the machine for cooperation with the indicia on the sheet.

The machine for carrying out the process in accordance with the invention is so constructed that the driving means for the working rollers of the upper, vertically displaceable group remain connected to said rollers during vertical displacement thereof. By way of example, the working rollers may be driven through the intermediary of telescopic or extensible shafts.

The adjustable supporting rollers and other adjustable members or elements of the upper rollers constitute, together with their driving means, parts of the vertically displaceable unit. Consequently, the machine can perform further operations without delay after discharge of each finished and shaped workpiece.

Preferably, the machine may be provided with means enabling the upward displacement of the upper rollers to be carried out in a rapid or high-speed manner.

Although the process according to the invention is especially suited for the manufacture of large structural parts, small workpieces may also be produced in a corresponding manner. Whereas in one of the embodiments described hereinafter, plane or flat sections or reaches of the workpiece alternate with curved sections or reaches, each of which may have a different or varying curvature, it is also possible to join a plurality of differently curved reaches to one another so that the finished structure has a curvilinear polygonal cross-section.

Alternatively, a plurality of flat sections may alternate with a plurality of curved sections. Moreover, flat sections may be connected to one another in different manners by curved sections.

It is further contemplated that the upper group of rollers and the lower group of rollers may be interchangeable. In lieu of a substantially horizontal path of sheet movement, the sheets may be moved in a vertical direction or in a plane inclined with respect to the horizontal, whereby the positions of the individual roller groups in the machine must be correspondingly altered.

In order to change the working depth of the rollers, one of the roller groups is generally tilted with respect to the other, but the same effect may also be obtained through adjustment of a single roller of one of the groups. Similarly, a change in the working depth of one roller between two others may be brought about by changing the spacing between the latter. Correctness of the adjustment of the machine for different structural parts may be determined by performing a test run with a form or pattern plate.

These and other objects and advantages of the invention will become further apparent from the following detailed description, reference being made to the accompanying drawings showing preferred embodiments of the invention.

In the drawings:

Fig. 5 is a perspective view of a modified construction of a machine according to the present invention; and Figs. 6 to 8 illustrate schematically the shaping of a structural member or part in accordance with the process of the present invention.

Figure 1:
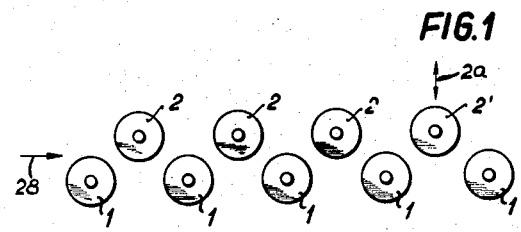
Fig. 1 is a schematic illustration of two groups of working rollers for a machine according to the present invention, one roller of one of said groups being vertically displaceable.

Referring now more particularly to Fig. 1, the roller system or train past which the metallic sheet (not shown) travels during shaping operations consists of five spaced, parallel working rollers 1 whose axes lie in a common plane, said rollers being disposed beneath the path of travel or movement of the sheet, and four spaced, parallel working rollers 2 whose axes also lie in a different common plane are disposed above said path of movement. The rollers 1 and 2 are staggered with respect to one another.

The terminal roller 2', which is the last of the upper rollers when viewed in the direction of sheet movement designated by the arrow 28, is arranged for vertical adjustment in the direction of the double-headed arrow 2a. Any conventional roller adjusting arrangement may be used for adjusting the position of terminal roller 2' such as the screws disclosed in U.S. Patent No. 483,362. Thus, the working depth of the roller 2' in the space between the two oppositely located rollers 1 can be changed during shaping of the sheet.

The working depth of the other rollers 2 remains constant during passage of the sheet between the groups of working rollers, but it may be so adjusted that the metallic sheet is deformed between each set of rollers 1 and 2. By virtue of the repeated oppositely directed deformation the sheet is smoothed out and tensions therein relieved, to ensure that the curvature ultimately imparted to the sheet by the roller 2' is permanently retained.

Figure 2:
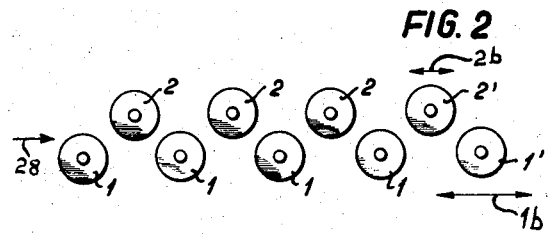
Fig. 2 is a similar schematic illustration of two working roller groups, in at least one of which a roller is horizontally displaceable.

A different manner of adjusting the working roller system is illustrated in Fig. 2. In this embodiment of the invention, the working depth of the roller 2', which is the last roller in the upper group of rollers as viewed in the direction of sheet movement 28, is not altered. Rather, the spacing of said last roller 2' from the next adjacent roller 2 is adjusted or varied, as shown by the double-headed arrow 2b, as well as the space between the last roller 1' of the lower group of working rollers from the next adjacent roller 1, as shown by the double-headed arrow 1b. The rollers may be adjusted by any suitable conventional mechanism.

This adjustment is effected during passage of the sheet between the rollers, whereby the radii of curvature of the various sheet sections discharged from between the rollers 1' and 2' are altered. Preferably, the means for adjusting the rollers 1' and 2' are coupled or related to one another in such a manner that the roller 1' is always displaced twice as far as the roller 2'.

If desired, a machine according to the present invention may be constructed so as to provide both of the adjustment features illustrated in Figs. 1 and 2 at the same time.

Figure 3:
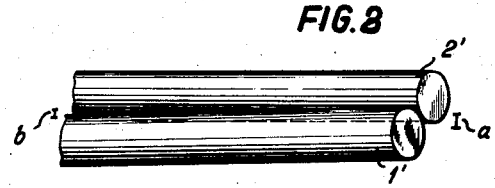
Fig. 3 illustrates a different type of adjustment of an upper working roller relative to a lower working roller.

Still a further manner of adjusting the relationship between the working rollers is illustrated in Fig. 3. In accordance with this embodiment of the invention, the working depth between the rollers 1' and 2' is not adjusted uniformly over the entire length of said rollers. Rather, the right-hand end (as seen in Fig. 3) of the working roller 2' is adjusted by an amount $a$ while the left-hand end is adjusted by an amount $b$, whereby the working depth of the roller 2' increases from left to right. Through such a non-uniform change of the roller working depth, the sheet may be bent or curved section by section like a conical surface, the ratio of $a$ to $b$ being predetermined in accordance with the desired characteristics of the ultimate product being shaped.

Figure 4:
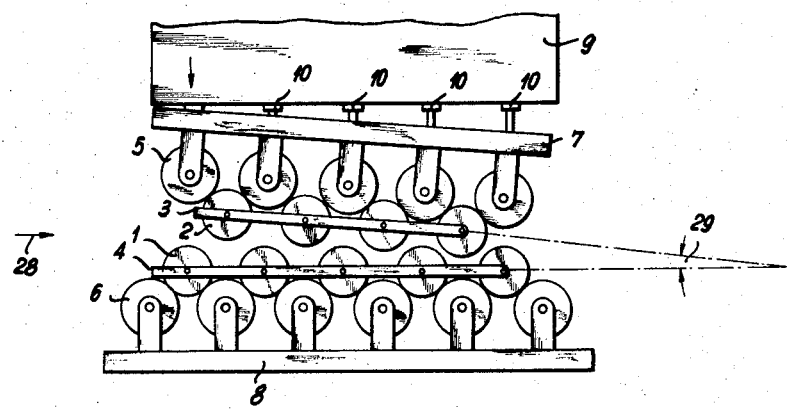
Fig. 4 is a schematic side elevational view of a straightening and supporting roller arrangement for a machine according to the present invention.

The adjustment of the rollers which effect the curvature of the sheet may be implemented by adjusting the entire groups or banks of working rollers with respect to one another. As shown in Fig. 4, the rollers 1 and 2 are supported in frames 4 and 3, respectively. The working rollers 1 and 2 bear against supporting rollers 6 and 5 which are in turn supported by carriers or holders 8 and 7, respectively. Since rollers 5 move in conjunction with holder 7, the rollers 2 bearing against rollers 5 will in effect move with the holder 7.

A plurality of supporting rollers 5 and 6 and carriers 7 and 8 therefor are spaced lengthwise of the working rollers 2 and 1, so that the latter, which have small diameters and thus are quite thin relative to their lengths, are prevented from yielding resiliently or elastically. The frame 3, rollers 2 and carrier 7 constitute a substantially rigid system or entity which is so adjustable that the frame 3 in which the rollers 2 are supported may be disbe disposed at an acute angle 29 with respect to the frame 4 which supports the rollers 1, the sides of the angle converging toward one another in the direction of movement or passage 28 of the sheet between the groups of rollers.

Thus, the working depth of the rollers increases in the direction of movement of the sheet. It will, of course, be realized that the angle 29 between the frames 3 and 4 shown in Fig. 4 is exaggerated for the purpose of illustration only, the angle in actual practice never being so large. By adjusting the inclination of the upper group of working rollers, the working depth of the rollers and thus the curvature of the sheet leaving the right-hand end of the roller system may be changed.

The frame 3 and the carrier 7 are secured to a slide or carriage 9 guided in a standard or other base element (not shown) of the machine, the slide 9 being provided with piston rod means 10 for adjusting the inclination of the upper group of working rollers 2. The piston rod means 10 are secured at one end to the slide 9, whereas the opposite end is secured to the carrier 7, so that upon the actuation of said piston rod means 10 by hydraulic means (not shown), or by other suitable means, the upper working rollers are caused to become inclined with respect to the lower working rollers. To facilitate removal of the form-finished structural member from the machine, the slide 9 including the carrier 7 and the group of upper working rollers 2 and their supporting means 5 are retracted upwardly.

The adjustment means for the upper roller bank are so constructed that the inclination of the rollers 2 with respect to the rollers 1 may be changed from the position illustrated in Fig. 4, in which the angle 29 points in the direction of sheet movement 28, to a position (not shown) in which the angle points in the opposite direction. In this manner, without any change in the direction of movement 28 of the sheet between the working rollers, the machine may be employed to straighten curved sheets.

Referring now to Fig. 5, the embodiment of the machine according to the present invention there shown is adapted to the shaping of sheets of metal four meters wide (13.2 feet). The machine comprises two standards 11 and 12 extending vertically from a base B and constituting guide means for a slide or carriage 13 to enable the latter to be vertically displaced. The upper working rollers 14 are supported by the slide or carriage 13 by being carried thereby, see Fig. 5, while the lower working rollers 15 are arranged in a frame 23 swingably mounted as at 24 about a vertical axis in the base B of the machine.

Each of the upper working rollers 14 bears against and is supported by two sets of eleven supporting rollers 16 which are mounted on holders or carriers 17 extending in the direction of movement of the sheet and spaced from one another transversely of said direction of movement. Similarly, each of the lower working rollers 15 bears against and is supported by two sets of eleven supporting rollers 16' which are mounted on holders or carriers 17' disposed parallel to the carriers 17.

The carriers 17 for the upper supporting rollers 16 are fixed to the slide or carriage 13, which is displaceable through hydraulic means 13'. The carriers 17' for the lower supporting rollers 16' are connected to a conventional hydraulic means, such as a suitable system of pistons similar to pistons 10 in Fig. 4 and connected directly to the carriers 17' subjected to fluid pressure, whereby said pistons take up the forces exerted on the lower group of working rollers 15. By means of such hydraulic means, the lower working rollers 15 are so displaced or adjusted during passage of the sheet of metal that the plane defined by the axes of said lower working rollers (considered as a unit) is inclined with respect to the plane defined by the axes of the upper working rollers 14 (considered as a unit).

To facilitate removal of the shaped metallic structural part, the slide 13 is displaced upwardly together with the upper working rollers 14 by means of member 25 connected to slide 13. The movement of the slide 13 is brought about by hydraulic means 13', which means may actuate a servo-motor which is operatively associated with said slide means; other well known means either mechanical or electrical could be employed to displace the slide. In order to ensure, however, that the upper rollers 14 remain connected to the driving means therefor (not shown) housed in the machine extension 18, even when the slide 13 is displaced or retracted upwardly, the coupling shafts (not shown) extending from the rollers 14 to the corresponding drive or gear shafts (not shown) consist of two telescopic shaft elements non-rotatable with respect to each other and connected to the rollers 14 by suitable linkages or joint heads, such as universal joints. The slide-displacing means 13' is preferably a high-speed or rapid-acting system.

Although the working rollers 14 and 15 are rigidly maintained in their position, due to the presence of the sets of eleven supporting rollers 16 and 16', while the metal sheet passes therebetween, the relatively small diameter of said rollers 14 and 15 renders them flexible to a certain extent. The carriers 17 and 17' may, if desired, be so adjustable that they need not be arranged in a common plane.

By way of example, the carriers 17 and 17' may be so arranged that the working rollers are vaulted longitudinally of themselves with the crest located substantially centrally thereof. Alternatively, the working rollers may be bent upwardly at a location other than their centers or arranged to yield in a downward direction upon passage of the sheet therebetween.

In lieu of the hydraulic means 13' for displacing the slide 13 and therewith the carriers 17, mechanical means may be employed, for example, threaded spindles, screw jacks or the like. Additionally, each carrier or holder 17 or 17' need not be constituted by a single unitary element extending along the entire path of movement of the sheet, but it may comprise a plurality of individually adjustable sections, each of which carries two supporting rollers 16 or 16'; such adjustment being brought about by hydraulic means (not shown) which actuate rod means thereby influencing movement of the working rollers with a resulting inclination of said working rollers. Again by way of example, these holder sections may be so adjusted that the bearing plane of the working rollers at one or both sides of the path of sheet movement forms not a flat but a curved surface.

Referring now to Figs. 6 to 8, it will be seen how a machine according to the present invention is employed in the manufacture of a railroad car roof part or section. The finished roof part has a shape as shown in Fig. 8 and includes a pair of substantially plane or flat sections 30 at its opposite ends which are intended for connection to the side walls of the railroad car. The plane sections 30 merge, respectively, into curved sections 31, at which the curvature of the roof part is greatest. The curvature decreases thereafter in the direction of the intermediate sections 32 until at the center of the roof part there is almost no curvature at all.

Specifically, the machine is first so adjusted that the metallic sheet is only straightened but not curved. As stated hereinabove, this necessitates that the planes formed by the axes of the upper and lower working rollers converge in a first position toward one another in a direction opposite to the first direction of movement of the metallic sheet (Fig. 6). In this manner, a substantially flat sheet of metal, for example four meters wide, may be passed through the machine until a section thereof having a length corresponding to the plane or flat section 30 protrudes beyond the right-hand or discharge end of the working roller system.

The working rollers are thereafter adjusted (Fig. 7) to incline one group thereof toward the other with the planes formed by the axes of the upper and lower working rollers converging toward one another in a second position in the direction of movement or travel of the sheet. Consequently, the section of the metal sheet immediately adjacent the section 30, upon leaving the roller system, is curved to an extent corresponding to the curved section 31 shown in Fig. 8.

During subsequent movement of the sheet between the working rollers, the latter are further adjusted to continuously decrease the degree of convergence of the planes of the bearing surfaces of said rollers (or of their axes), whereby the curvature of the sheet is also decreased, corresponding to the section 32 shown in Fig. 8. When the central portion of the sheet has passed through the roller system, the inclination of the working rollers relative to one another is removed or eliminated. The machine is stopped only when the last or left-hand section of the sheet is located still in flat condition between the rollers.

The direction of rotation of the working rollers is now reversed and the rollers are gradually adjusted relative to one another in a manner directly opposite to that described above thereby assuming a third position for shaping the left-hand or leading section of the sheet. Thus, with a reversed direction of movement of the sheet, the outermost portion of the left-hand section remains flat or plane as section 30 shown in Fig. 8, while thereafter due to the adjustment of the rollers relative to one another curved sections 31 and 32 are formed between said left-hand section of the sheet and the center thereof, as seen in Fig. 8. At this time, of course, the sheet leaves the machine at that side which originally was the entrance or feed side.

Upon completion of the shaping operation, the upper roller group is rapidly displaced upwardly or away from the lower group so that the finished roof part may be removed from the machine, said roof part being immediately ready for use in construction and assembly of a car roof without further treatment. In the event that the machine is made four meters wide, only six such roof parts are needed for covering a standard railroad passenger car, compared to the eight parts required heretofore.

In order to facilitate accurate timing of the adjustments of the working depths of the working rollers, indicia may be prearranged on the sheet at predetermined intervals, while a sighting device or, if desired, a reference or index mark is disposed on the machine. In this manner, the adjustments of the working rollers may be effected in a predetermined sequence in accordance with passage of said indicia past the index mark or the sighting device.

The control of the roller working depth may also be effected automatically depending on the extent of entry of the sheet into the machine, as by means of cam plates, form plates or templates or by means of groups of such plates or templates combined with one another in the manner of rollers and arranged for easy exchange or replacement. Alternatively, a special electric adjustment motor may be provided in combination with presettable means for controlling said motor.

Still further, the machine may be provided with two groups of working rollers on each side of the path of movement of the sheet, i.e., with four groups of such working rollers in all. In this modification of the invention the rollers on one side or edge of said path may be adjusted independently of the rollers on the other side or edge of said path.

As stated hereinabove, the invention may be implemented by working rollers oriented otherwise than substantially horizontally as shown in Figs. 1 to 8. Thus, the rollers 1 or 15, which, in effect, serve as backing or support means for the sheet being worked, may be positioned vertically or at any desired inclination relative to the horizontal, in which case the orientation of the rollers 2 or 14 would be changed accordingly as would the manner of adjusting the latter so as to change their working depths.

Separation of the opposite groups of working rollers is generally effected by displacing one of said groups away from the other and in a direction at an angle, and preferably substantially transverse, to the direction of travel of the sheet through the machine.

By way of resume, therefore, the method of shaping the structural member in accordance with the present invention may be said to comprise the steps of moving the metallic sheet along a tortuous path of predetermined length and thereby flexing the sheet alternately and repeatedly in opposite direction. After a flat section of predetermined dimensions protrudes past the end of the tortuous path, a further section of the sheet contiguous with the flat section is subjected to a final flexure in one direction to impart a desired curvature to said further section of the sheet. Thereafter, the magnitude of the final flexure is varied or adjusted during further movement of the sheet along the tortuous path, whereby at least one additional section of the sheet, contiguous with both the above-mentioned further section and with a center section of the sheet, has imparted thereto a curvature which is smaller than the curvature of said further section. The center section remains substantially uncurved, and the above steps are then repeated on the remainder of the sheet to form a flat end section and curved sections interconnecting this end section with the center section. The two flat end sections are, of course, subsequently connected to the side walls of a railroad car or like structure for which the structural member is to serve as a roof or roof part.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. The process of producing a curved structural member from a sheet of metal having a first end, an intermediate portion and a second end; comprising the steps of initially feeding said first end of said sheet in a first direction by passing the same in said first direction along a predetermined path to straighten said sheet between working rollers lying, respectively, in planes formed by the axes of rollers of respective roller banks, which planes in a first position converge toward one another in a direction opposite to said first direction of the feeding of said sheet, and which roller banks each include rollers which are staggered with respect to the rollers of the other bank and which have parts thereof penetrating between the rollers of the other bank, thereby influencing said sheet to become substantially flat, thereafter adjusting at least one of said working roller banks with respect to the other roller bank so that said planes in a second position converge toward one another in the direction of the feeding of said sheet, whereby upon further feed movement of said sheet between said working rollers of said respective roller banks with said planes in said second position said first end of said sheet is subjected to a predetermined curvature, then further adjusting at least one of said roller banks and continuing the feed of said sheet between said respective roller banks so that when said intermediate portion of said sheet passes between said respective roller banks said planes formed by the axes of said rollers of said respective roller banks continuously decrease their degree of convergence becoming substantially parallel planes, whereby the curvature of said sheet is also continuously decreased, then reversing the rotation of the rollers after said second end of said sheet has been substantially straightened, thereby effecting feed movement in a second direction opposite said first feed direction while simultaneously adjusting one of said working roller banks with respect to the other roller bank so that said planes formed by the axes of said rollers of said respective roller banks in a third position converge toward one another in the direction of the feeding of said sheet in said second direction, whereby upon further feed movement of said sheet in said second direction said second end of said sheet is subjected to a predetermined curvature.

2. The process of producing a curved structural member from a sheet of metal having a first end, an intermediate portion and a second end; comprising the steps of initially feeding said first end of said sheet in a first direction by passing the same in said first direction along a predetermined path to straighten said sheet between working rollers lying, respectively in planes formed by the axes of rollers of respective roller banks, which planes in a first position converge toward one another in a direction opposite to said first direction of the feeding of said sheet, and which roller banks each include rollers which are staggered with respect to the rollers of the other bank and which have parts thereof penetrating between the rollers of the other bank, thereby influencing said sheet to become substantially flat, thereafter adjusting at least one of said working roller banks with respect to the other roller bank so that said planes in a second position converge toward one another in the direction of the feeding of said sheet, whereby upon further feed movement of said sheet between said working rollers of said respective roller banks with said planes in said second position said first end of said sheet is subjected to a predetermined curvature, then further adjusting at least one of said roller banks and continuing the feed of said sheet between said respective roller banks so that when said intermediate portion of said sheet passes between said respective roller banks said planes formed by the axes of said rollers of said respective roller banks continuously decrease their degree of convergence becoming substantially parallel planes, whereby the curvature of said sheet is also continuously decreased, then reversing the rotation of the rollers after said second end of said sheet has been substantially straightened, thereby effecting feed movement in a second direction opposite said first feed direction, while simultaneously adjusting one of said working roller banks with respect to the other roller bank so that said planes formed by the axes of said rollers of said respective roller banks in a third position converge toward one another in the direction of the feeding of said sheet in said second direction, whereby upon further feed movement of said sheet in said second direction said second end of said sheet is subjected to a predetermined curvature, and finally spacing one of said roller banks from the other respective roller bank so as to obtain access to said curved sheet.

References Cited in the file of this patent

UNITED STATES PATENTS

| | | |
|---|---|---|
| 205,588 | Tasker | July 2, 1878 |
| 483,362 | O'Brien | Sept. 27, 1892 |
| 1,414,371 | Nilson | May 2, 1922 |
| 1,923,738 | McBain | Aug. 22, 1933 |
| 2,136,714 | Simons | Nov. 15, 1938 |
| 2,219,163 | Maussnet | Oct. 22, 1940 |
| 2,358,960 | Cleve | Sept. 26, 1944 |
| 2,503,597 | Rodder | Apr. 11, 1950 |
| 2,638,143 | Maust | May 12, 1953 |

FOREIGN PATENTS

| | | |
|---|---|---|
| 583,889 | Germany | Sept. 11, 1933 |
| 749,791 | Germany | Dec. 6, 1944 |
| 487,494 | Canada | Oct. 21, 1952 |